(12) United States Patent
Gunaratne et al.

(10) Patent No.: US 9,460,179 B1
(45) Date of Patent: Oct. 4, 2016

(54) SYSTEMS AND METHODS FOR PROVIDING ADAPTIVE VISUALIZATION OF SYNCHRONIZATION OF MULTIPLE FILES

(71) Applicant: Google Inc., Mountain View, CA (US)

(72) Inventors: Junius Gunaratne, Brooklyn, NY (US); David Adam Wurtz, Boulder, CO (US)

(73) Assignee: Google Inc., Mountain View, CA (US)

( * ) Notice: Subject to any disclaimer, the term of this patent is extended or adjusted under 35 U.S.C. 154(b) by 349 days.

(21) Appl. No.: 14/155,075

(22) Filed: Jan. 14, 2014

(51) Int. Cl.
*G06F 17/30* (2006.01)

(52) U.S. Cl.
CPC .............. *G06F 17/30575* (2013.01)

(58) Field of Classification Search
USPC ......................... 707/609, 610, 736
See application file for complete search history.

(56) References Cited

U.S. PATENT DOCUMENTS

| | | | |
|---|---|---|---|
| 9,069,444 B1* | 6/2015 | Hansen | G06F 3/0482 |
| 2013/0282658 A1* | 10/2013 | Besen | G06F 17/30215 707/634 |
| 2014/0201138 A1* | 7/2014 | Dorman | G06F 17/30174 707/610 |
| 2015/0052105 A1* | 2/2015 | Nguyen | G06F 17/30174 707/626 |
| 2015/0112927 A1* | 4/2015 | Lee | G06F 17/30233 707/610 |

\* cited by examiner

*Primary Examiner* — Debbie Le
(74) *Attorney, Agent, or Firm* — Ropes & Gray LLP

(57) ABSTRACT

A system and method for synchronizing files to a cloud storage service provides an adaptive visual display that offers details of the synchronization process of each file being synchronized. Information included in the display can include details of the progress and status of the file synchronization for a particular file, as well as a group of files. Files being actively synchronized are locked in the display for the user view. Files that are not actively synchronized may scroll in the display so that the user can view information about multiple files being synchronized during a given synchronization.

14 Claims, 6 Drawing Sheets

SYSTEMS AND METHODS FOR PROVIDING ADAPTIVE VISUALIZATION OF SYNCHRONIZATION OF MULTIPLE FILES

BACKGROUND

Cloud computing services provide users with the ability to store, access, edit, and share electronic files using any electronic device capable of connecting to the cloud computing service over a remote network, such as the Internet. The files are stored on the cloud computing service rather than the user's electronic devices. The cloud computing service provides a user interface, for example through a web browser, for users to access and view the files. The files stored on cloud computing services may include word processing documents, spreadsheet files, presentation files, picture files, audio files, video files, and a number of other open or proprietary file formats.

Some users may wish to access and store files locally on a client computer or other storage location. At other times, users may access and store files on the cloud system or other location. Harmonizing or backing up those files can be accomplished by synchronizing the files to the cloud service. The synchronization process however, can be time consuming, and information about the details of the synchronization process for each file is not presented to the user during the synchronization process.

SUMMARY

The systems and methods described herein provide adaptive visualization of a synchronization process so that a user can understand the status and other details of the synchronization. The user may be provided a visual display that includes information about the synchronization of a group of files as well as information about each file in a group that is being synchronized. The visual display is updated in real time as the synchronization progresses so that the user may view current synchronization status information for each file. In addition, the display may lock in the user view file information for files being actively synchronized, and scroll file information for files not being actively synchronized.

An aspect described herein discloses a method for providing information for a synchronization of a plurality of files to a cloud storage system. The method includes receiving at a cloud computing service a request to synchronize a plurality of files stored at a source location. The cloud computing service may determine a total number of the plurality of files and identify file information for each of the plurality of files. Synchronization of the files is performed between the source location and a cloud storage location. The cloud computing service will construct a list of each of the plurality of files being synchronized to display to the user, and display the list to a user. The displayed list includes status information for synchronization of the total number of the files as well as current status information for synchronization of each file of the plurality of files. The list has file information for files being actively synchronized locked in the user's view. File information for files not being actively synchronized can scroll in the list. Indicators of the synchronization status may be provided, for example, that synchronization is in progress, completed, recently completed, failed, or other indicator. The list may also include options for interacting with the file.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to providing information to a user about synchronizing files where the synchronization is between a source location and a cloud storage system. Information is provided to the user for each file that is synchronized as well as information for any group of files that is being synchronized. Information regarding files being actively synchronized is provided in the user display. Information for files not being actively synchronized may scroll in the user display. Providing detailed information to the user during a synchronization allows the user to know the current progress of the synchronization as well as understand whether individual files are being synchronized or not. Providing such information to the user can be helpful, for example, when there are network latency issues or if the synchronization is taking a long time and the user may be tempted to pause, reset or otherwise interfere with the synchronization.

Figure 1:
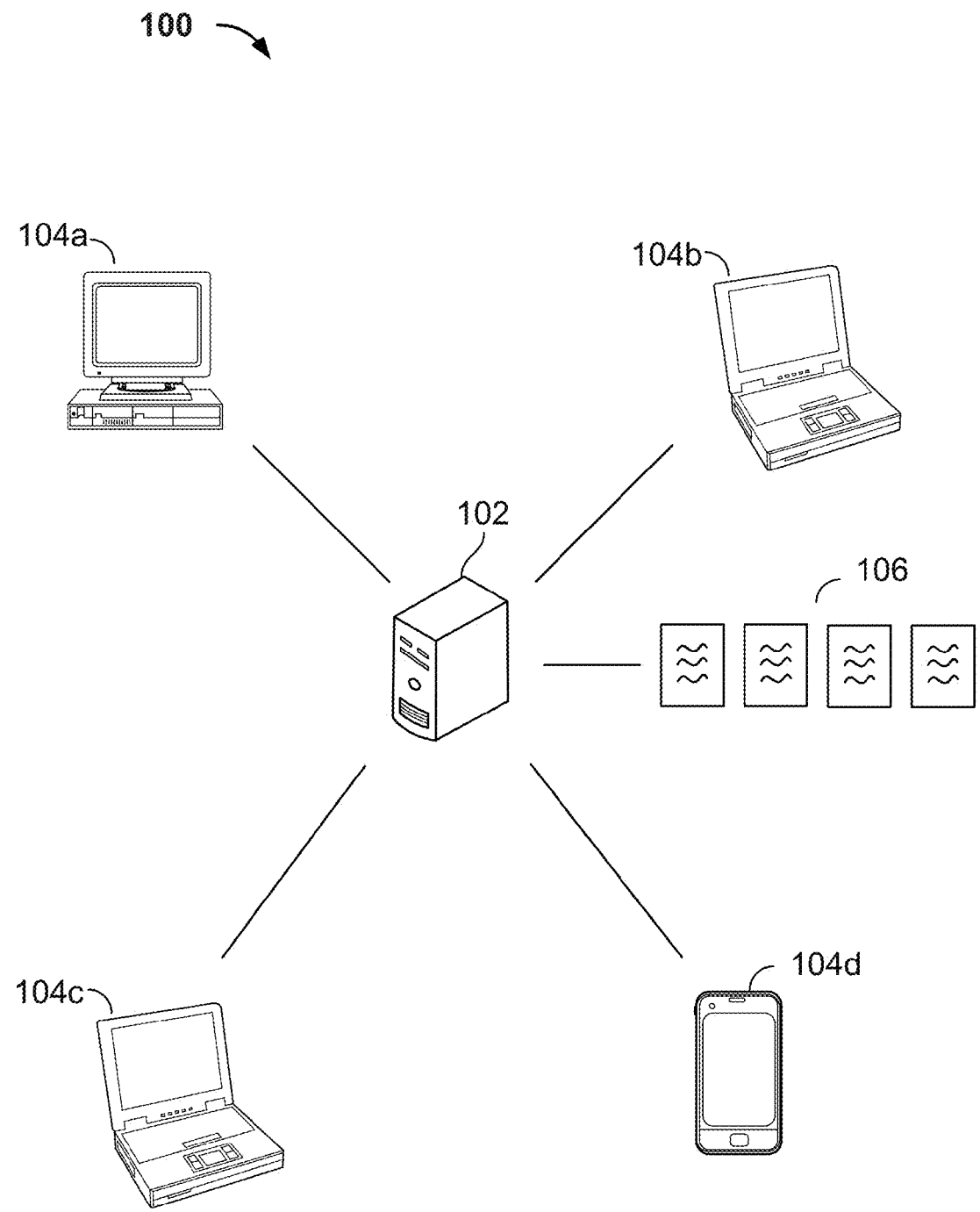
FIG. 1 shows a number of client computers in communication with a cloud computing service in accordance with an implementation as described herein.

First, a network system in which a number of client computers may connect to a cloud computing service is described. FIG. 1 shows a network system 100 that includes cloud computing service 102 and a number of client computers 104a through 104d. Cloud computing service 102 may include one or more servers that collectively provide cloud computing services for a number of client computers. Cloud computing service 102 stores a number of files accessible by client computers 104a-104d, such as files 106. Files 106 may include word processing documents, spreadsheets, presentations, images, audio files, video files, or any other files of various open or proprietary file types. Users may create, edit, copy, share, and delete files stored on cloud computing service 102. Client computers 104a-104d may include desktop computers, laptop computers, tablets, smart phones, mobile electronic devices, or any other device that may connect to cloud computing service 102 to view files 106. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

Figure 2:
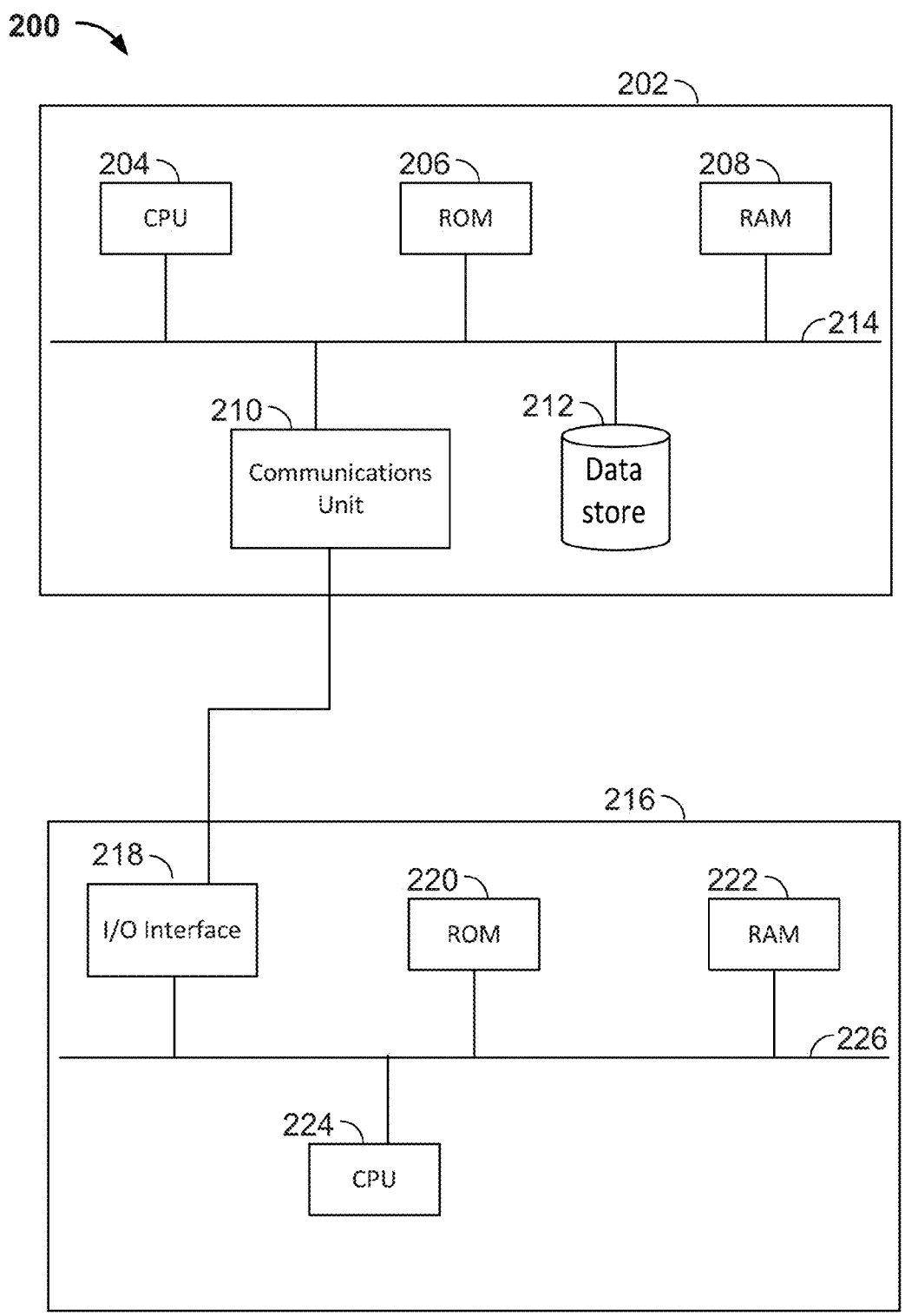
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 216. Cloud computing service 202 includes a central processing unit (CPU) 204, read-only memory (ROM) 206, random access memory (RAM) 208, communications unit 210, data store 212, and bus 214. Cloud computing service 202 may have additional components that are not illustrated in FIG. 2. Bus 214 allows the various components of cloud computing service 202 to communicate with each other. Communications unit 210 allows cloud computing service 202 to communicate with other devices, such as client computer 216 and other client computers. Data store 212 is used to store files accessible by a user on client computer 216. Users log on to the cloud computing service using a username and password, and cloud computing service 202 provides a user interface for the display of files through the web browsers executing on the client computers.

Data store 212 may also store metadata regarding files and users, and may store tables, matrices, files and other data structures based on the file and user metadata. The data structures may be used by cloud computing service 202 in synchronizing files. The data structures may be updated or recalculated on a periodic basis by a data process scheduler executed by CPU 204. File and user metadata may be changed by recent user actions, so data structures based on the metadata are recalculated to account for those recent actions. CPU 204 may load some data structures to RAM 208, e.g. a data cache, while CPU 204 processes requests to provide a scored list of applications. The data cache allows CPU 204 to reference recently used data and is periodically refreshed.

Client computer 216 includes a CPU 224, ROM 220, RAM 222, input/output interface 218, and bus 226. Memory on the client computer 216 may be used to store local copies of files. Client computer 216 may have additional components that are not illustrated in FIG. 2. Bus 226 allows the various components of client computer 216 to communicate with each other. Input/output interface 218 allows client computer 216 to communicate with other devices, such as cloud computing service 202. Input/output interface 218 also includes devices for taking in user inputs and displaying outputs to a user, such as a keyboard, mouse, and display screen. CPU 224 executes various programs stored in memory on client computer 216, such as a web browser. Web browsers are used, among other things, to display a user interface provided by cloud computing service 202 for viewing and editing files. Web browsers receive web page documents encoded in HTML, CSS, or other web-compatible languages and interpret the language to properly display the web page.

Data store 212 for storing files, applications, and data structures on cloud computing service 202, a web browser executing on client computer 216, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CDROM, CDR, CD+R, CDRW, CD+RW, DVDROM, DVDR, DVD+R, DVDRW, and DVD+RW).

Users of a cloud computer service can store files in the cloud system. The user may also wish to use the same files locally on one or more client devices. For example, when a user does not have access to the cloud service, the user may edit the files on the client device. In other situations, the user may access the files on the cloud service using a different client or without accessing the local files. When this happens, the users files may differ between the local client copy or copies and the cloud system. To avoid losing files or other user data, the user can initiate a back up or a synchronization so that the files on the cloud service are synchronized with those at the source location. When the user initiates the synchronization, the user typically selects, in a user interface for a data directory, a file, group of files, a folder, directory or other file location and initiates the synchronization by sending a request to the cloud storage system. Synchronization can also be initiated automatically, for example, whenever a user accesses a particular device and logs into the cloud storage system.

Figure 3:
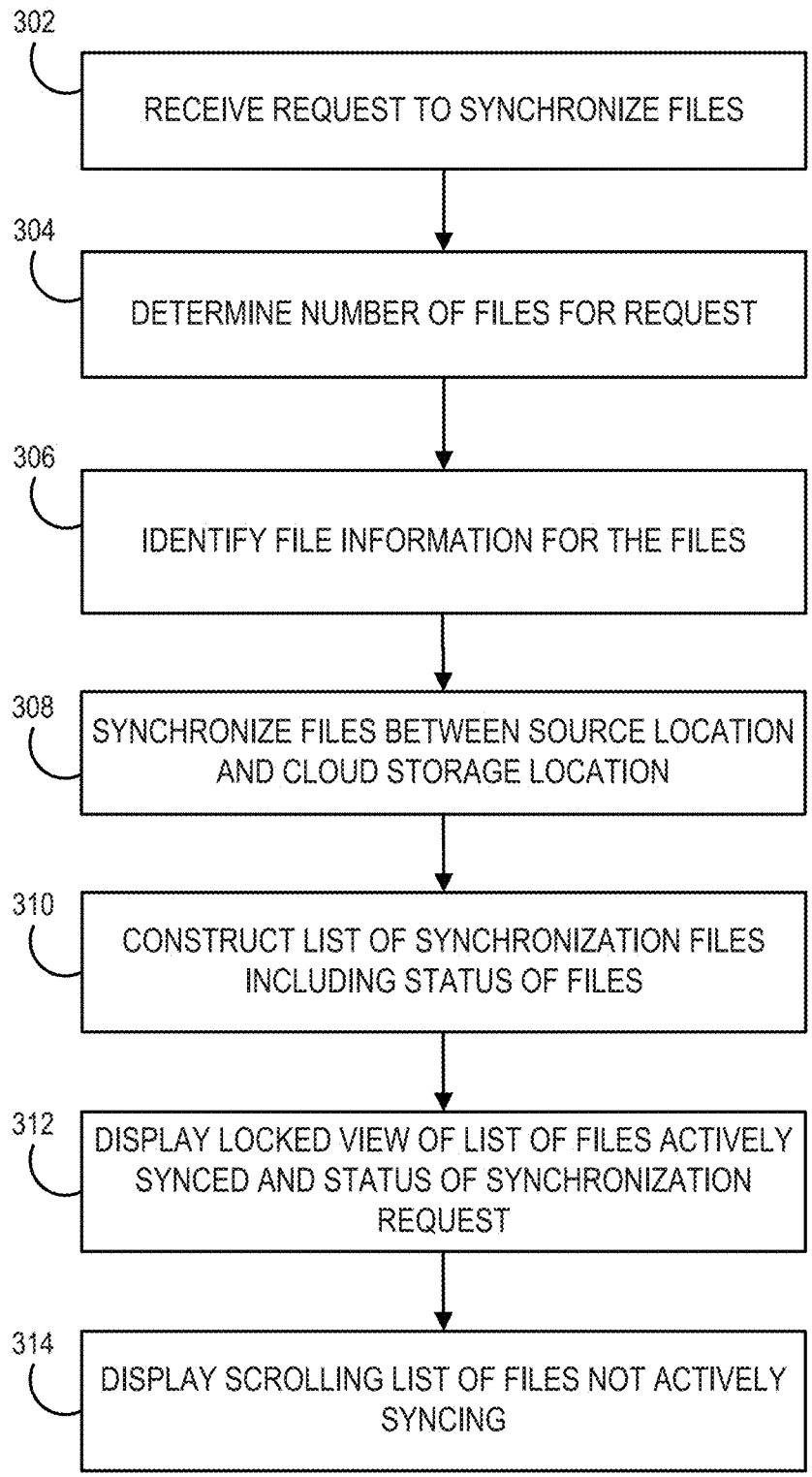
FIG. 3 shows a method for providing a file synchronization display in accordance with an implementation as described herein.

Methods for presenting synchronization information to a user are now described. Method 300 illustrated in FIG. 3 shows a method for providing information to a user of a synchronization process, which includes receiving a request to synchronize files, determine the number of files in the request, identify file information for the files, synchronize the files between the source location and the cloud storage location, construct a list of synchronization files including status of files, display a list of synchronization files being actively synchronized, status of the synchronization of the files and a group of files, and a scrolling list of files not being actively synchronized. Method 300 may be performed on one or more servers that provide a cloud computing service, such as cloud computing service 102 in FIG. 1 or cloud computing service 202 in FIG. 2 in communication with a client device, for example, 104a-d in FIG. 1 or 216 in FIG. 2.

Method 300 begins when the cloud computing service receives a request to synchronize files, shown at 302. The synchronization request may be sent by a user, for example, a user may select files, folders, directories, or other data location from a user interface for a local storage on a client device and cause a synchronization process to initiate. In some scenarios, the user may select the folders via a cloud storage service user interface and cause the cloud storage system to check for client copies on one more client devices. In another scenario, synchronization of user files may occur automatically every time a user logs into a cloud storage service from a particular client device.

After the cloud computing service receives the request, the cloud computing service determines the number of files for the synchronization request, shown at 304. The cloud computing service also identifies file information for the files in the synchronization request, shown at 306. The number of files and information about the files in the synchronization request may be obtained by querying file metadata for the files selected for the synchronization, for example, file names, version information, document history and other document metadata. The version information can be used to determine which file copy is the most recent version of a document so that a synchronization operation updates document copies, rather than undoes recent changes and saves to an older version. Details of the files for the synchronization operation may be stored in a data store and referred to during the synchronization process.

The synchronization operation may commence, as shown at 308 so that the selected files are synchronized between the source location and the cloud storage location. As each file is synchronized, the synchronization progress is recorded in the data store on a periodic basis. For example, as each file in the group of files is synchronized, a synchronization manager for the cloud storage system may store data indicating that the file synchronization has initiated, then that it is in progress, and then completed, or not completed. Files queuing in the synchronization process may have entries in the data store indicating their queue status.

A list may be constructed of the files in the synchronization operation including the status of the files, shown at 310. The details of the synchronization operation may be queried on a periodic basis to be included in the list that is displayed to the user to show synchronization status. The cloud computing service will collect details of the synchronization operation from the data store to display in a list. The list of synchronization files and respective status is displayed to the user in a user interface on the user client device. The list may be constructed or generated upon initiation of the synchronization operation and the details for the synchronization operation may be obtained from the data store periodically as the synchronization operation progresses.

The list is displayed to the user having a locked view of the file or files that are being actively synchronized, as well as overall status of the synchronization request, as shown in 312. The list is displayed in a user interface in a client device. Only files that are being actively synchronized are always shown in the displayed list of files and file status. Files that are not being actively synchronized are also shown in the displayed list, however they may be shown in a scrolling list, as shown in 314. Thus, the user is presented with a view of actively syncing files and respective synchronization status information, and a scrolling list of files and respective synchronization status for files that are not being actively synchronized.

The speed of the scrolling in the list may be controlled by the user. In addition, the user may control what types of files to view in a list, for example, to limit the number of items shown in a display. In addition to the details of every file being synchronized, overall synchronization operation status is also provided to the user in the displayed list so that the user can understand and see the overall status of a synchronization operation as well as the file level status for an individual file in the synchronization operation. In this way, the user can see where the synchronization operation stands, for example, in a synchronization of 100 files, which files are actively synchronizing, as well as information for any one of the 100 files that are queuing, uploading, downloading, synced, or failing to sync.

Figure 4A:
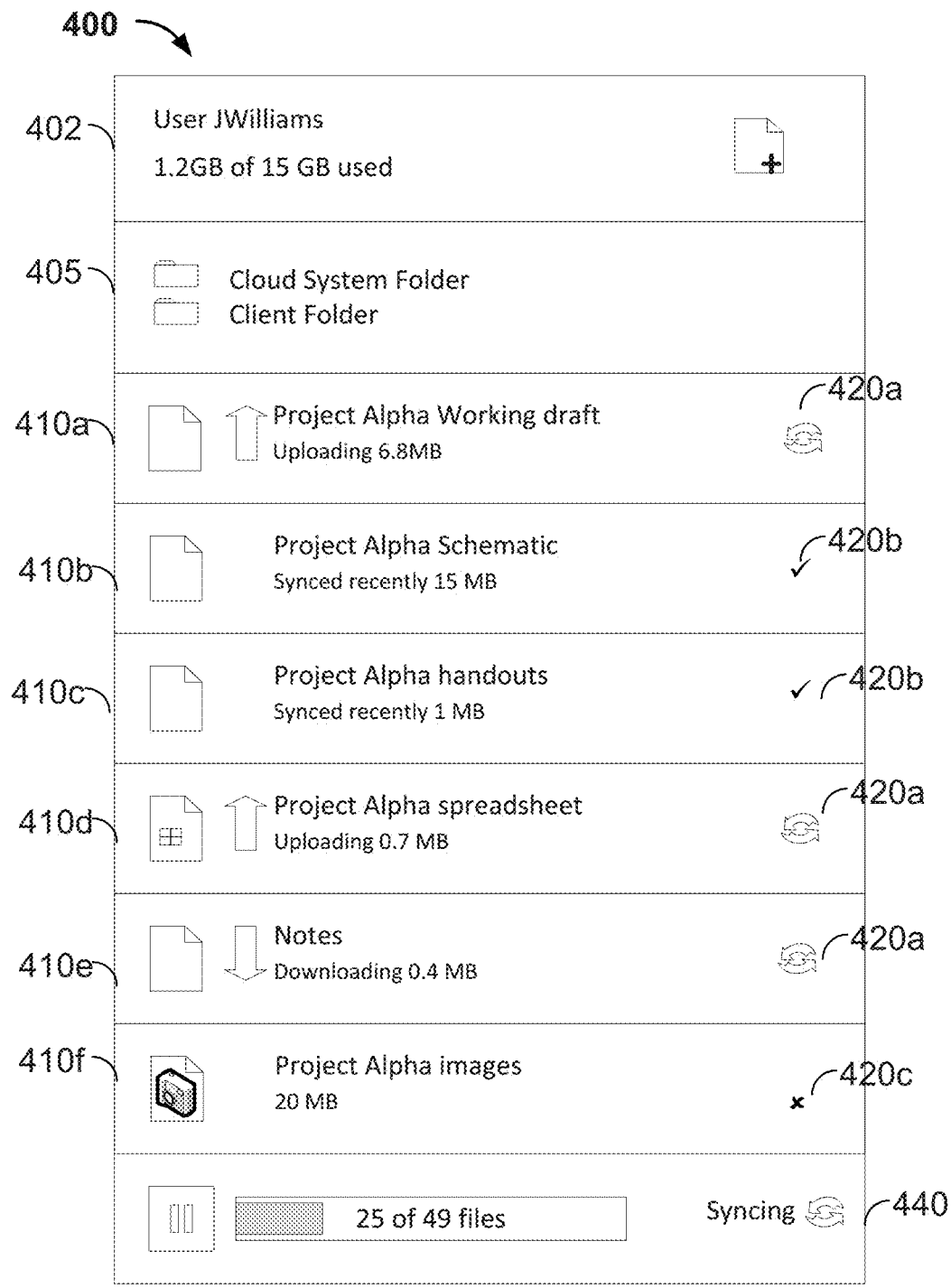
FIGS. 4A-C show a display of information for a synchronization of files in accordance with an implementation as described herein.

Turning to FIG. 4A, the synchronization list 400 may include user information 402, including, for example, a user identifier and user information such as file storage usage. The list may also include information 405 about the source and destination for the synchronization, for example, a client folder name and a cloud system folder. The files 410a-f being synchronized are also listed together with respective details for each file. Files 410a-f may be represented by an icon that can indicate its file type. For example, file 410a includes a document name, information indicating that it is uploading. An in-progress sync icon 420a is also shown for file 410a. File 410b is shown with its file name and also information indicating that it has synced recently. The file size for 410b is also provided. A sync completed icon 420b is also shown for file 410b. Similar information is presented for file 410c and 410d. The file 410e is shown as downloading, indicating that it is being synchronized from the cloud storage system to a client device. File 410f is shown with an "X" 420c indicating that it is not being synchronized and that a problem may have occurred. The synchronization list 400 also includes overall synchronization operation information 440 indicating that the operation is syncing and in progress, and also the total number of files that have synced out of a group of files. The synchronization list 400 may also include options for pausing the synchronization operation, as well as an option for adding additional files to the synchronization.

Figure 4B:
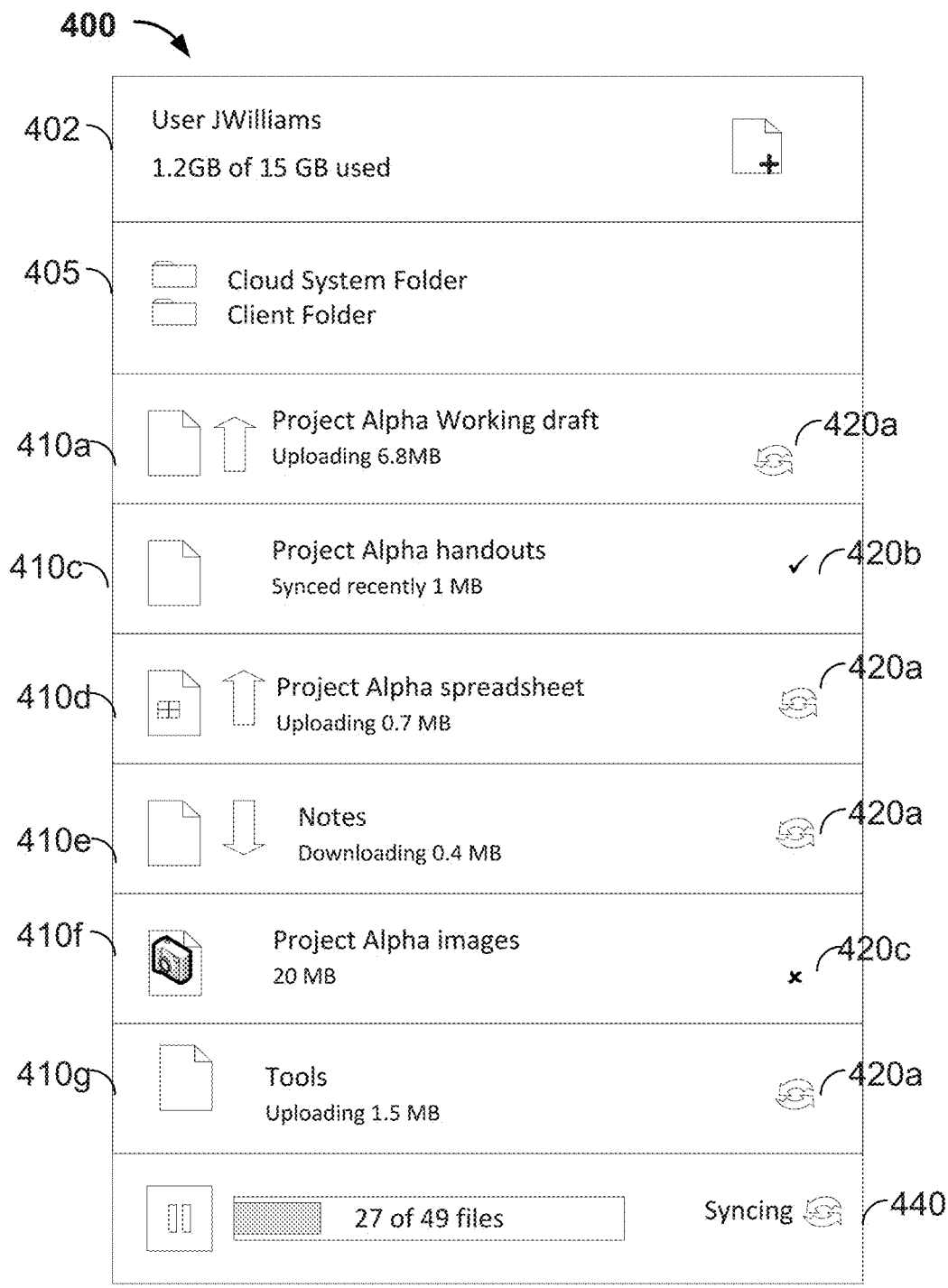

FIG. 4B shows another view of synchronization list 400 as the synchronization operation progresses. In the example shown in FIGS. 4A-C, 49 files have been selected to be synchronized between cloud system folder and client folder. Since a list of 49 files could be difficult to view all at one time, the list can scroll so that information about each file can be viewed by the user. In FIG. 4B, the first synced file 410b from FIG. 4A is not shown because it has scrolled out of view. The first file in the list 410a shown in FIG. 4A remains the first file in the list in FIG. 4B because it is still actively syncing. A new file 410g is the next file in the list following the formerly last file 410f shown at the bottom of the list. As the synchronization operation continues, the scrolling of the list also continues and the files scroll in and out of view on the list.

Figure 4C:
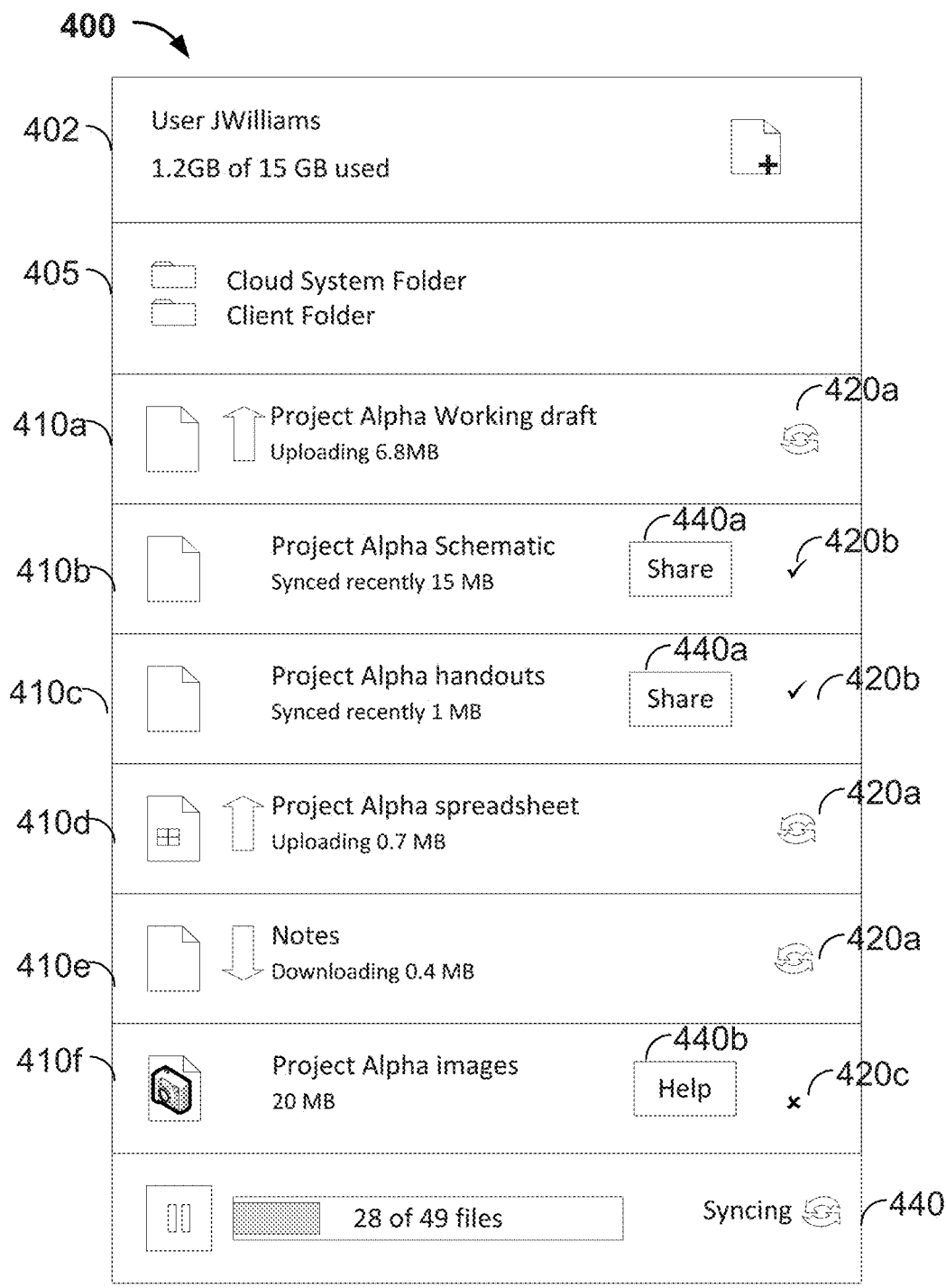

FIG. 4C shows some additional options that can be available on the synchronization list for use with a file being synchronized, for example a "share" button 440a and a "help" button 440b. The "share" button 440a may be provided in the list for files that have been synced so that the user has an easy way to share a document that is up to date on the cloud storage system. Selecting the share button will trigger a request to the cloud storage system that the respective document have some changes made to the user access controls of the document so that other users may access the document. The "help" button 440b may be provided in the synchronization list for files that have synchronization problems. Some examples of synchronization problems can include inconsistent document history information that may not match that which is expected based on a last cached history in the data store, exceeding file size requirements, failing authentication or authorization requirements, files having malware or other defects can also cause synchronization problems.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing information for a synchronization of a plurality of files to a cloud storage system, the method comprising:
   receiving at a cloud computing service a request to synchronize a plurality of files stored at a source location;
   determining a total number of the plurality of files; identifying file information for each of the plurality of files;
   synchronizing each of the files of the plurality of files between the source location and a cloud storage location;
   constructing a list of each of the plurality of files being synchronized to display to the user, wherein the list comprises current status information for synchronization of each file of the plurality of files, and status information for synchronization of the total number of files; and
   displaying the list to a user at a client device, wherein the list display locks in view the current status information for synchronization of each file of the plurality of files that is actively synchronizing, wherein displaying the list comprises scrolling the list of the plurality of files and respective status information for synchronization of each file of the plurality of files that is not actively synchronizing.

2. The method of claim 1 further comprising, when synchronization of a respective file of the plurality of files is completed, displaying a completion indicator.

3. The method of claim 2 further comprising adding the file to the scrolling list.

4. The method of claim 2 further comprising providing an option to interact with the file.

5. The method of claim 1 further comprising determining whether the synchronization of a respective file of the plurality of files is an upload or a download, and displaying the determined synchronization type with status information for the respective file of the plurality of files.

6. The method of claim 1 further comprising, if a synchronization of a respective file of the plurality of files encounters a problem, displaying an problem indicator.

7. The method of claim 1 further comprising, updating the list and the status information in real time.

8. A system for providing information for a synchronization of a plurality of files to a cloud storage system, the system comprising a server configured to:
   communicate with the plurality of client devices;
   receive a request from one of the plurality of client devices to synchronize a plurality of files stored at a source location;
   determine a total number of the plurality of files; identify file information for each of the plurality of files;
   synchronize each of the files of the plurality of files between the source location and a cloud storage location;
   construct a list of each of the plurality of files being synchronized to display to the user, wherein the list comprises current status information for synchronization of each file of the plurality of files, and status information for synchronization of the total number of files; and
   display the list to a user at the requesting client device, wherein the list display locks in view the current status information for synchronization of each file of the plurality of files that is actively synchronizing, wherein displaying the list comprises scrolling the list of the plurality of files and respective status information for synchronization of each file of the plurality of files that is not actively synchronizing.

9. The system of claim 8 further comprising, when synchronization of a respective file of the plurality of files is completed, displaying a completion indicator.

10. The system of claim 9 further comprising adding the file to the scrolling list.

11. The system of claim 9 further comprising providing an option to interact with the file.

12. The system of claim 8 further comprising determining whether the synchronization of a respective file of the plurality of files is an upload or a download, and displaying the determined synchronization type with status information for the respective file of the plurality of files.

13. The system of claim 8 further comprising, if a synchronization of a respective file of the plurality of files encounters a problem, displaying an problem indicator.

14. The system of claim 8 further comprising, updating the list and the status information in real time.

* * * * *